United States Patent [19]

Truty et al.

[11] Patent Number: 4,945,200
[45] Date of Patent: Jul. 31, 1990

[54] ELECTRICAL DISCHARGE MACHINE APPARATUS MOVING WIRE ELECTRODE GUIDE ASSEMBLY

[75] Inventors: Thomas J. Truty, South Barrington; William R. Fricke, Bloomingdale; James M. Ceriale, Green Oaks, all of Ill.; Jule L. French, Yoder; Kevin M. Newell, Marion, both of Ind.

[73] Assignees: Fort Wayne Wire Die, Inc., Fort Wayne, Ind.; T-Star Industrial Electronics Corp., Wheeling, Ill.

[21] Appl. No.: 325,284

[22] Filed: Mar. 17, 1989

[51] Int. Cl.⁵ .............................................. B23H 7/10
[52] U.S. Cl. ................................................ 219/69.12
[58] Field of Search ............... 219/69.12, 69.11, 69.16, 219/69.15, 68, 69.2, 69.14

[56] References Cited

U.S. PATENT DOCUMENTS

| | | | |
|---|---|---|---|
| 2,066,588 | 1/1937 | Taylor | 219/69.12 |
| 2,974,216 | 3/1961 | Inoue | 219/69.12 |
| 3,943,322 | 3/1976 | Lehmann et al. | 219/69.12 |
| 4,121,080 | 10/1978 | Janicke | 219/69.12 |
| 4,364,812 | 12/1982 | Inoue | 219/69.12 |
| 4,539,459 | 9/1985 | Yamagata | 219/69.12 |
| 4,559,433 | 12/1985 | Aramaki et al. | 219/69.12 |
| 4,564,431 | 1/1986 | Miyano | 219/69.12 |
| 4,605,834 | 8/1986 | Inoue | 219/69.12 |
| 4,803,328 | 2/1989 | Obara | 219/69.12 |

FOREIGN PATENT DOCUMENTS

| | | | |
|---|---|---|---|
| 56-76337 | 6/1981 | Japan . | |
| 56-82133 | 7/1981 | Japan . | |
| 59-10225 | 3/1984 | Japan . | |
| 59-53129 | 3/1984 | Japan | 219/69.12 |
| 60-238233 | 11/1985 | Japan | 219/69.12 |
| 249531 | 12/1985 | Japan | 219/69.12 |
| 60-249531 | 12/1985 | Japan | 219/69.12 |
| 61-76216 | 4/1986 | Japan | 219/69.12 |
| 61-117015 | 6/1986 | Japan . | |
| 61-1547 | 7/1986 | Japan . | |
| 236430 | 10/1986 | Japan | 219/69.12 |
| 162428 | 7/1987 | Japan | 219/69.12 |

Primary Examiner—Philip H. Leung
Assistant Examiner—Geoffrey S. Evans
Attorney, Agent, or Firm—George Pappas

[57] ABSTRACT

A guide assembly for guiding an electrical discharge machine apparatus moving wire electrode through a workpiece. The guide assembly includes first, second, and third guide members, each having a bore for receiving the moving wire electrode and a current pickup is located between the second and third guide members. The first guide member is closest to the workpiece. The first and second guide members are mounted on a guide body at respective first and second openings communicating with one another through a wire passageway through the guide body. The guide body includes a threaded portion and a nut member is used for engaging the threaded portion and attaching the guide body to the support assembly. The nut member includes a housing defining a fluid passageway and an outlet bore for creating a threading fluid stream.

37 Claims, 6 Drawing Sheets

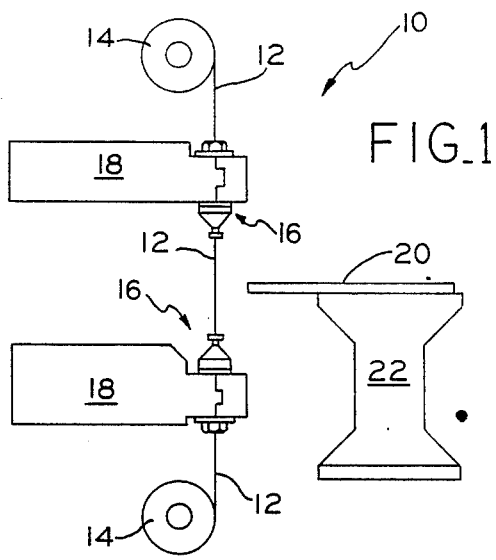
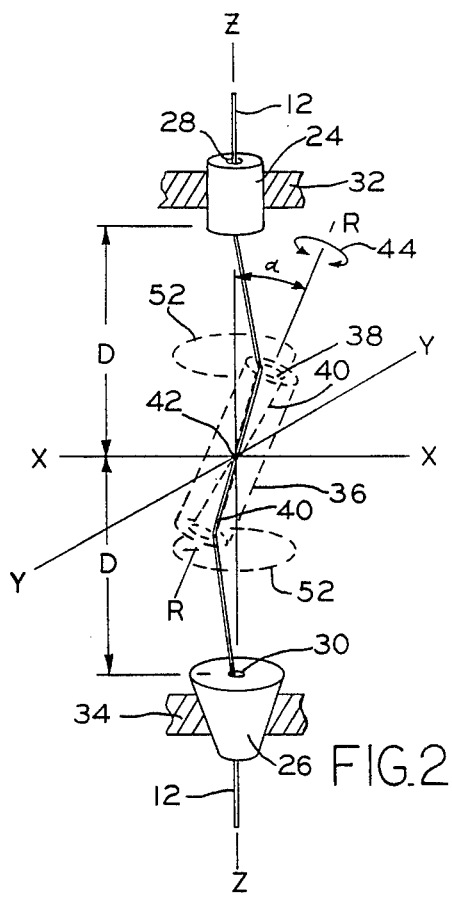
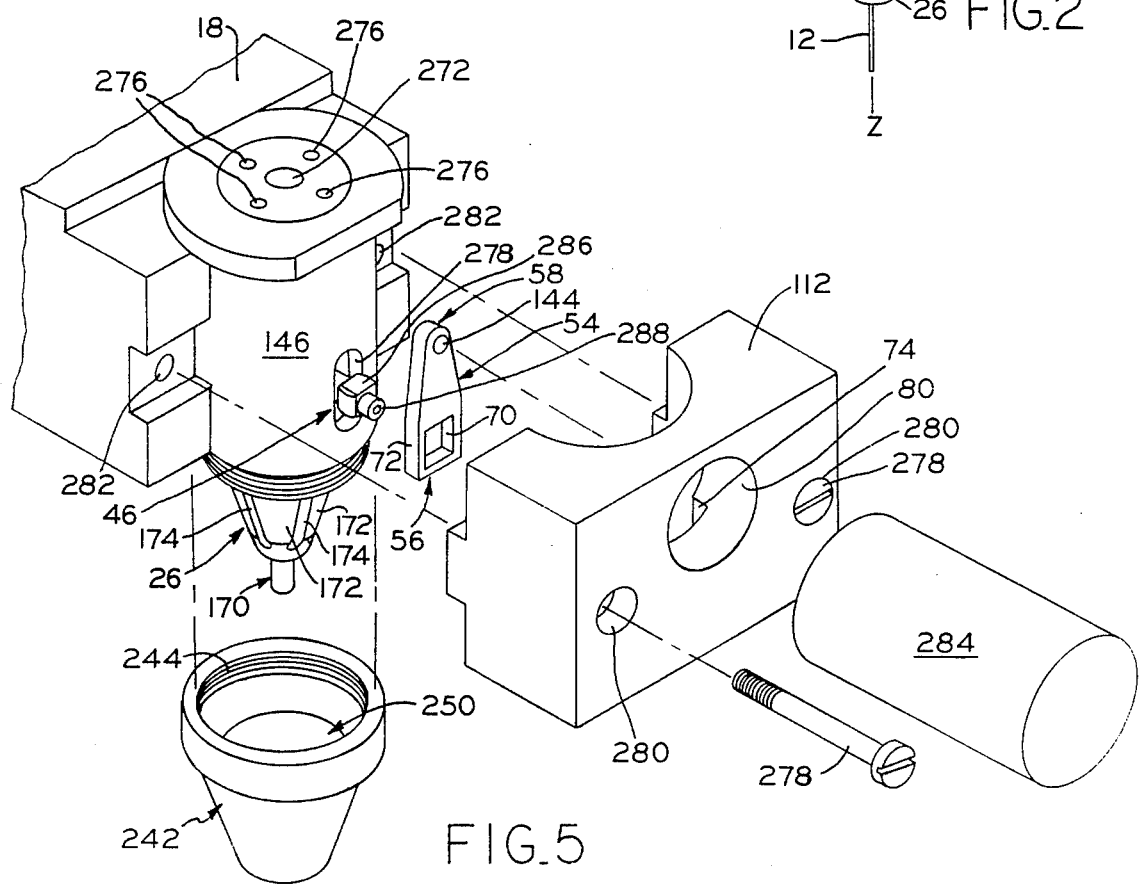

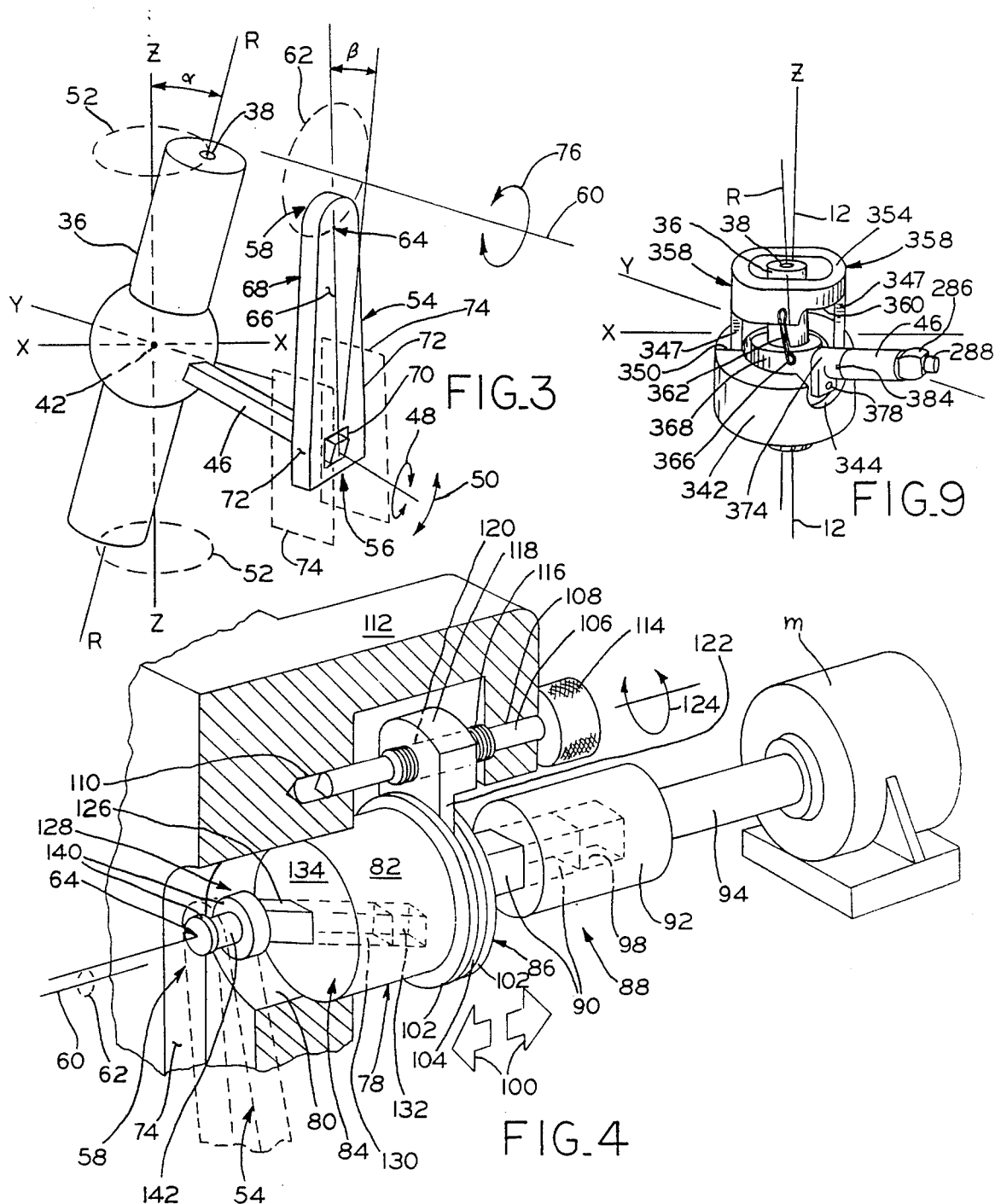

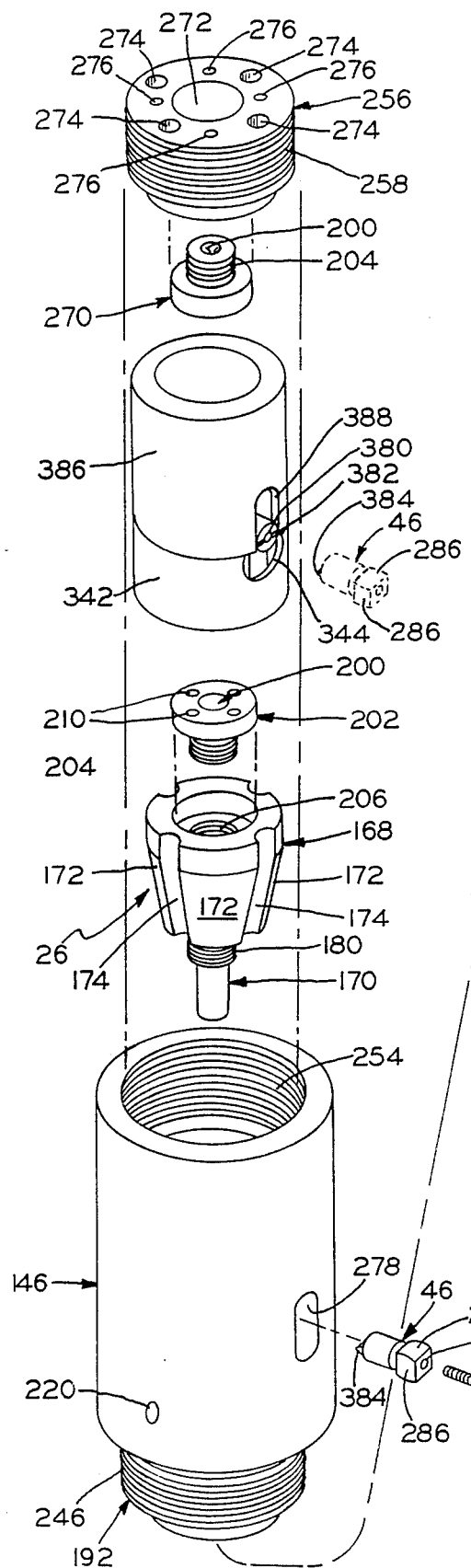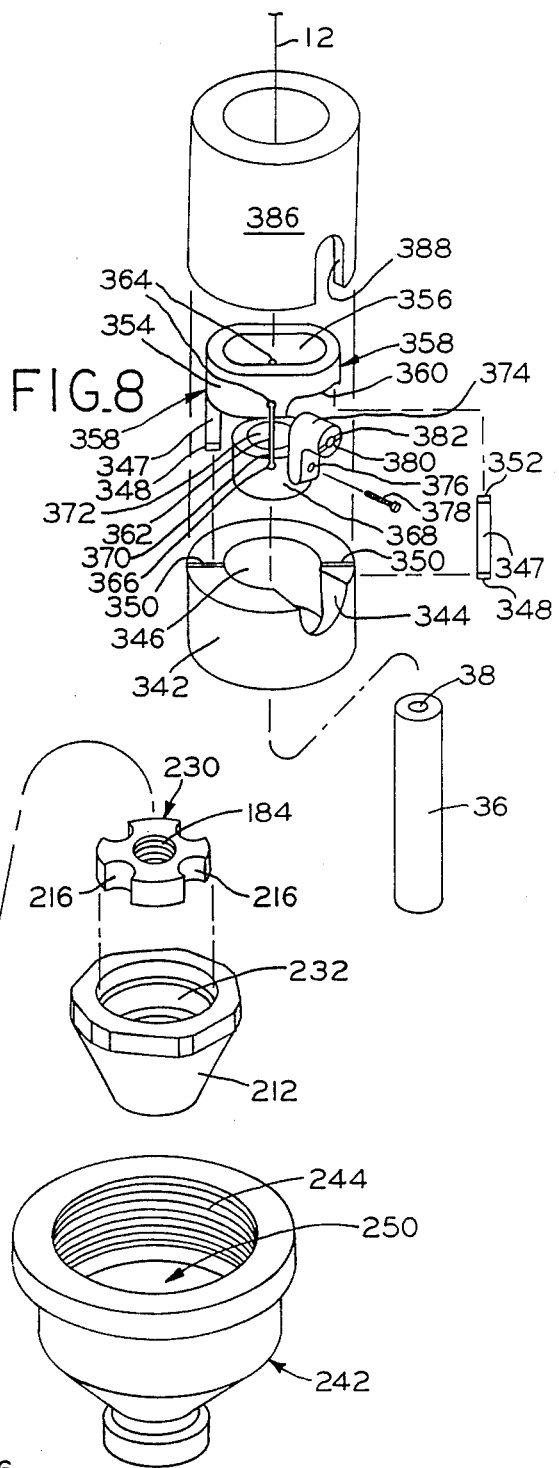

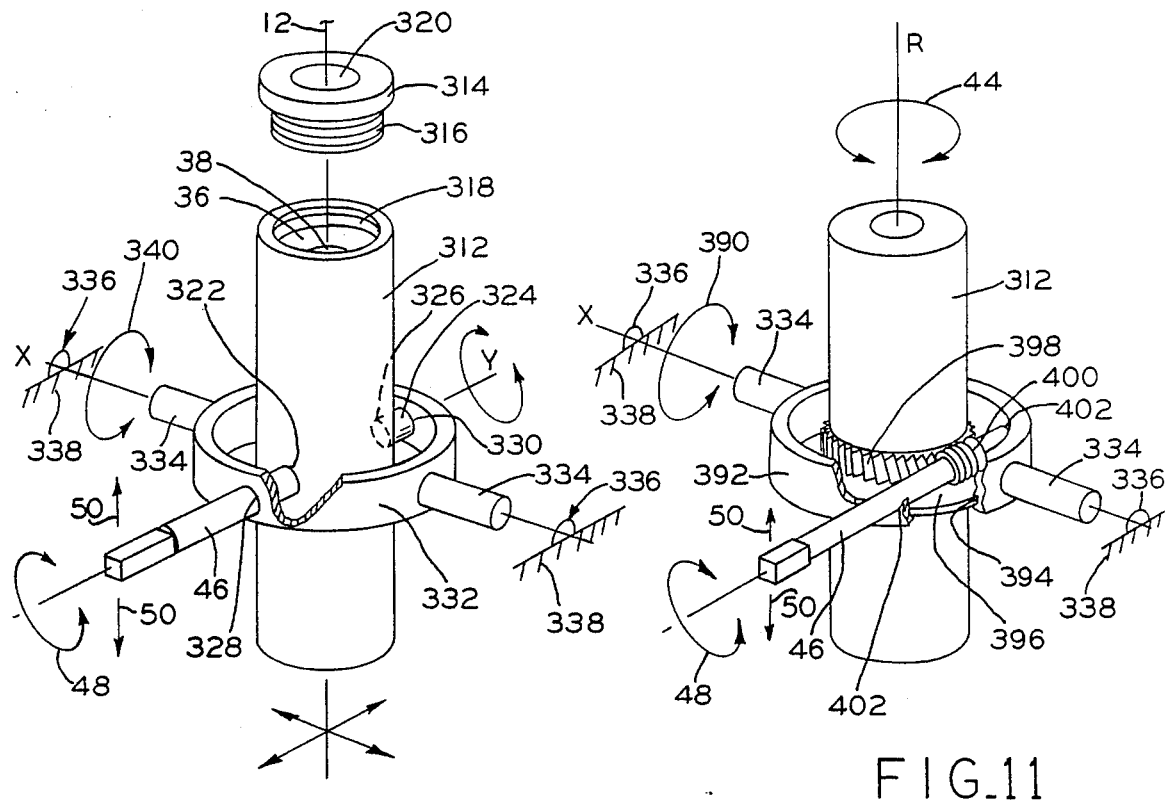
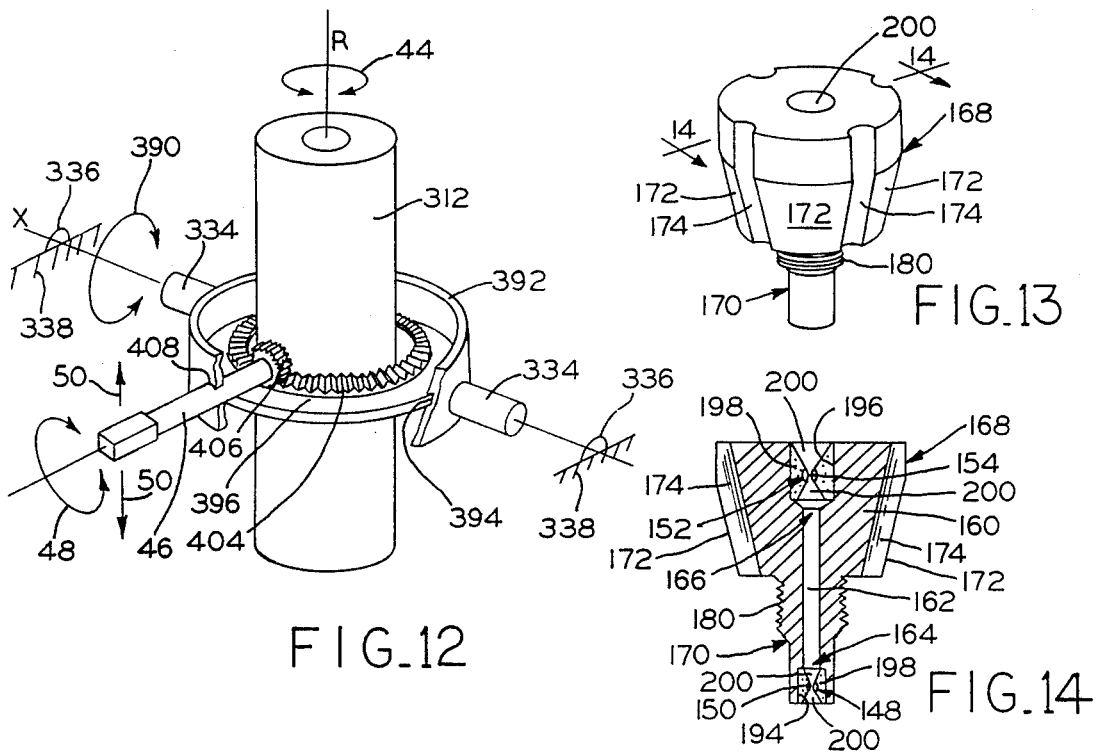

4,945,200

ELECTRICAL DISCHARGE MACHINE APPARATUS MOVING WIRE ELECTRODE GUIDE ASSEMBLY

TECHNICAL FIELD

The present invention relates to the technical field of electrical discharge machine (EDM) apparatuses having a traveling wire electrode. More specifically, the present invention relates to a guide assembly whereby the moving wire electrode is guided through a current pickup assembly and, also, accurately guided for cutting a workpiece.

BACKGROUND OF THE INVENTION

EDM apparatuses utilizing a moving wire electrode are commonly presently used in making precise cuts and shaping various electrically conductive materials or workpieces. Typically, the wire electrode is wound around and travels between two turning spools and a pair of wire guides or guide assemblies wherethrough the wire travels are used to accurately situate or guide the moving wire electrode at the proper location and at an angle with respect to the workpiece being cut. The wire and workpiece are placed at different electrical potentials and a controlled electrical spark traveling between the wire and workpiece causes the workpiece to be eroded and cut or shaped in a desired configuration.

The older wire guides, as for example, is disclosed in Hague et al., U.S. Pat. No. 4,250,371 utilizes groove guides for positioning the wire electrode with respect to the workpiece. A disadvantage with the groove guides is that they are, in essence, unidirectional.

Other wire electrode guides utilize a hole or bore slightly larger in diameter than the wire electrode for guiding the wire and are, thus, multidirectional. Examples of these are shown in U.S. Pat. Nos. 4,539,459, 4,559,433, 4,250,371, and also in Japanese application Nos. 59-102253, 59-195654, 59-237616, 59-93256, 53-143932, 54-33574, 54-56005, 54-56591, 54-58930, 54-150893, 54-157314, 54-162051, 55-3910. However, the prior multidirectional wire guides have substantial shortcomings and drawbacks. For example, the final or post guide members are part of an overall guide assembly and depend on other components for the accurate placement of the guide member bores. Further, as the guide members wear, the entire guide assembly generally must be disassembled and the whole post guide or pre guide body housing the guide members must be replaced. Further yet, vibrations placed on the wire by the various current pickup assemblies is carried through the post or final guide and causes inaccuracies in the cutting of the workpiece. Accordingly, a need exists for a guide assembly that solves the problems associated with prior guides and guide assemblies while decreasing manufacturing costs and providing for easier replacement of the various guide members.

SUMMARY OF THE INVENTION

It is the principle object of the present invention to overcome the above-discussed disadvantages associated with prior moving wire electrode guide assemblies.

The present invention overcomes the disadvantages associated with prior guide assemblies by providing first, second, and third guide members having a bore for receiving the moving wire electrode therethrough and guiding the moving wire electrode. The current pickup assembly or current pickup is located between the second and third guide members and the first guide member is located closest to the workpiece. Accordingly, any vibrations that may be placed by the current pickup assembly onto the moving wire electrode is substantially cancelled by the second guide member and the wire exits or enters the first guide member with substantially no vibration, thereby increasing cutting accuracies. The second and third guide members are also placed at an equal distance from the midpoint of the current pickup thereby providing equal tension in the wire electrode, both above and below the midpoint.

Both the post guide and pre guide bodies are adapted to threadingly receive a plug wherein a respective guide member is mounted. Accordingly, when the guide members located in the plugs become worn, the entire post guide or pre guide bodies are not discarded. Rather, a new plug wherein a guide member is mounted is merely replaced. Further, the plugs for both the post and pre guide bodies are interchangeable thereby decreasing the numerous different parts required to be held on hand.

The post guide body is adapted to be retained or clamped on a support assembly or the frusto-conical portion of a barrel through a support or barrel hole. More specifically, the post guide body includes a passageway therethrough between first and second openings. The first guide member is mounted on the guide body with its bore communicating with the passageway through the first opening and the second guide member is mounted on the guide body with its bore communicating with the passageway through the second opening. The guide body is enlarged towards the second opening and is thinner towards the first opening so that the enlarged portion is larger than and does not fit through the support hole while the thinner portion is received through the support hole. The thinner portion is also threaded and threadingly engages a guide nut member that is larger than the guide support hole. Thus, the post guide body is mounted to the support or barrel via the enlarged portion and guide nut member clampingly engaging the support. It should be noted that the second guide member is mounted in a plug threadingly received in the post guide body and can be replaced without having to disassemble the guide body from the support structure or barrel.

In addition, the guide nut member includes a housing defining a fluid passageway surrounding the thinner portion of the guide body. The housing includes inlet ports and outlet ports communicating with the fluid passageway and the outlet port receives the moving wire electrode therethrough during operation. The inlet ports are adapted to communicate with channels in the enlarged guide body portion and a threading fluid received from the channels is directed through the inlet ports to the fluid passageway and out through the outlet port and creating a threading fluid stream for directing the wire electrode from one guide body final guide member to another or second guide body final guide member bore. The guide nut member used in retaining the second guide body on the second support structure includes an enlarged frusto conical outlet bore for aiding automatic threading.

In one form thereof, the present invention is directed to a guide assembly for guiding an electrical discharge machine apparatus moving wire electrode through a workpiece. The guide assembly includes first, second, and third guide members, each having a bore receiving the moving wire electrode therethrough and guiding the moving wire electrode. A current pickup is located between the second and third guide members in contact with the moving wire electrode and placing electric current thereon. The first guide member is located closest to the workpiece.

In one form thereof, the present invention is directed to a guide assembly for guiding an electrical discharge machine apparatus moving wire electrode through a workpiece. The guide assembly includes a guide body having a wire passageway therethrough between first and second openings and a first guide member having a bore therethrough is mounted on the guide body with the first guide member bore communicating with the passageway through the first opening. A guide support having a hole therethrough is provided. The guide body is enlarged towards its second opening and is thinner towards its first opening. The enlarged portion is larger than the guide support hole and the thinner portion is threaded and is smaller than the guide support hole and is received therethrough. A guide nut member is provided having threads for mating engagement with the thinner portion threads and is larger than the guide support hole so that upon mating engagement of the nut member with the thinner portion threads, the guide support is locked between the guide body enlarged portion and the nut member.

BRIEF DESCRIPTION OF THE DRAWINGS

The above-mentioned and other features and objects of this invention and the manner of obtaining them will become more apparent and the invention itself will be better understood by reference to the following description of embodiments of the invention taken in conjunction with the accompanying drawings wherein:

FIG. 1 is a diagrammatic side elevational view of an electrical discharge machine apparatus;

FIG. 2 is a diagrammatic perspective view showing the various operations of the current pickup assemblies in conjunction with a guide assembly according to the present invention;

FIG. 3 is a diagrammatic perspective view showing the operation of the control shaft and connecting rod according to the present invention;

FIG. 4 is a cross-sectional perspective view of a typical drive means and variable displacement means according to the present invention;

FIG. 5 is an exploded perspective view of a guide assembly housing a current pickup assembly according to the present invention;

FIG. 6 is an exploded perspective view of the guide assembly shown in FIG. 5 according to the present invention;

FIG. 8 is an exploded perspective view of another gimball means according to the present invention;

FIG. 9 is an assembled perspective view of the gimball means shown in FIG. 8 according to the present invention;

FIG. 10 is a perspective diagrammatic view of another gimball means according to the present invention;

FIG. 11 is a diagrammatic perspective view of a pivot means in conjunction with a rotation means according to the present invention;

FIG. 12 is a perspective diagrammatic view of another pivot means and rotation means according to the present invention;

FIG. 13 is a perspective view of a typical guide assembly post guide member according to the present invention;

FIG. 14 is a cross-sectional view of the post guide member shown in FIG. 13

Corresponding reference characters indicate corresponding parts throughout the several views of the drawings.

Figure 7:
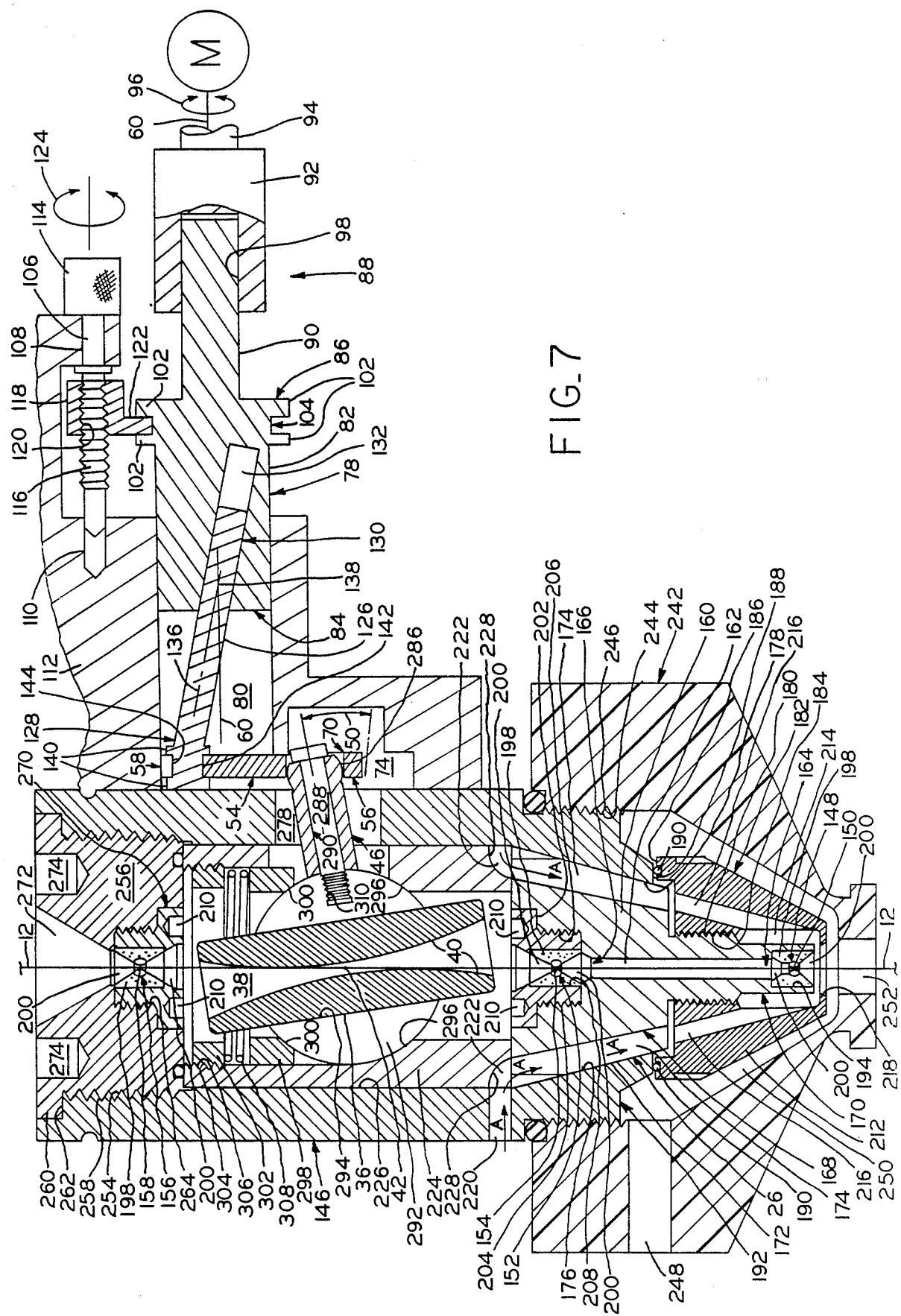
FIG. 7 is a cross-sectional view showing a current pickup assembly using one type of gimball means in conjunction with the guide assembly, variable displacement means, and drive means according to the present invention.

The exemplifications set out herein illustrate preferred embodiments of the invention in one form thereof and such exemplifications are not to be construed as limiting the scope of the disclosure or the scope of the invention in any manner.

DETAILED DESCRIPTION OF SPECIFIC EMBODIMENTS

The specific embodiments, as shown in the figures, relate to current pickup assemblies for placing electric current on an electrical discharge machine apparatus moving wire electrode, as well as guide assemblies for guiding an electrical discharge machine apparatus moving wire electrode.

As shown in FIG. 1, an electrical discharge machine, generally indicated as 10, utilizes a wire electrode 12 wrapped around spools 14. Spools 14 are rotated and wire electrode 12 travels therebetween. Wire guide assemblies generally indicated as 16, are mounted on the ends of arms 18. Wire electrode 12 is received through assemblies 16 and is guided thereby. Workpiece 20, generally made of a conductive material, is held on table 22 so that it may be cut and/or shaped by the moving wire electrode 12. More specifically, arms 18 and/or table 22 are moved with respect to one another so that wire electrode 12 may travel through workpiece 20 cutting and shaping the same in a predetermined desired manner. Arms 18 may be displaced with respect to one another and also thereby cutting workpiece 20 at a given desired angle. The cutting and shaping of workpiece 20 is caused by the moving wire electrode 12 as it travels between spools 14 by the placement of a different electrical potential on wire 12 and workpiece 20, thereby causing a spark therebetween and electroeroding workpiece 20 in the proximity of the traveling wire electrode 12.

The working features of the current pickup assemblies are diagrammatically shown in FIGS. 2 and 3 whereat the X, Y, and Z axes are utilized depicting a three dimensional or perspective diagram. The Z axis defines the normal straight line of travel for moving wire electrode 12 between pre guide member 24 and post guide member 26. Pre guide member 24 includes a bore or hole 28 therethrough and post guide member 26 also includes a bore or hole 30 therethrough. Bores 28 and 30 are adapted for receiving therethrough wire electrode 12 and guiding the same along the Z axis or the normal straight line of travel. Pre guide member 24 is affixed and supported on pre guide support 32 and post guide member 26 is affixed and supported on post guide support 34. A conductive body is depicted in dashed lines and as having a generally cylindrical shape 36. Conductive body 36 is preferably made of tungsten or tungsten carbide. Conductive body 36 includes a bore 38 longitudinally through conductive body 36 and having a longitudinal axis R. Conductive body bore 38 is also depicted in dashed lines and is also depicted as being curvilinear in cross section and cylindrically shaped, increasing in diameter outwardly from the longitudinal midpoint, here shown as the intersection between the X and Y axes. Thus, a contact wall 40 is provided in conductive body 36 here depicted as the wall of conductive body bore 38. Conductive body 36 is electrically connected to a power source (not shown) and transfers or places electrical current on wire electrode 12 as wire electrode 12 rubs or slides against and contacts contact wall 40.

In a first embodiment, according to the present invention, conductive body bore longitudinal axis R is situated at an angle alpha ($\alpha$) with respect to the Z axis or the normal straight line of wire travel. In this embodiment, angle $\alpha$ is fixed and wire electrode 12 travels through bore 38 and, under normal tension, wire electrode 12 contacts contact wall 40 on one side at one end of midpoint 42 and contacts contact wall 40 on the other side at the other end of midpoint 42. Therefore, deformation or curl of wire electrode 12 is substantially minimized and, thus, cutting accuracy is increased. So as to further minimize deformation or curl of wire electrode 12, guide members 24 and 26 are situated at an equal distance D away from midpoint 42. In this fashion, the tension in wire electrode 12 on both sides of midpoint 42 is substantially equal and, also, the rubbing or contact surface between wire electrode 12 and contact wall 40 is substantially equal on both sides of midpoint 42, thus, equally cancelling any deformation on wire electrode 12 caused by the rubbing thereof against contact wall 40. So as to maximize the useful life of conductive body 36, there is provided a means for rotating conductive body 36 about bore longitudinal axis R as indicated by arrows 44. The means for rotating can be manual or automated. Further, the rotation of conductive body 38 can be linear, thus, causing substantially even wear on contact wall 40 or, in the alternative, can be incremental.

In a second embodiment, a pivot means is provided for supporting conductive body 36 and selectively pivoting the conductive body bore axis R at any desired angle $\alpha$ with respect to the normal straight line of wire travel or the Z axis. In this second embodiment, the benefits of the above-discussed first embodiment are attained. Further, conductive body bore longitudinal axis R can selectively be situated collinear with the Z axis, thus, making manual and/or automatic threading of wire electrode 12 substantially easier. By selectively increasing angle $\alpha$ between longitudinal bore axis R and the Z axis, the tension on wire electrode 12 can also be selectively increased or decreased, thus, also providing selective control of the electrical transfer between contact wall 40 and wire electrode 12 and selective control of the wear of contact wall 40. As with the above-discussed first embodiment, a means for rotating conductive body 36 may also be provided with the second embodiment, thus, substantially fully utilizing contact wall 40 and increasing the useful life thereof. Various means for pivoting and rotating are described hereinbelow.

In yet a third embodiment of the current pickup assembly, a gimball means is provided for supporting conductive body 36 and selectively gimballing the bore longitudinal axis R about midpoint 42. Thus, bore longitudinal axis R may be pivoted about mutually perpendicular and intersecting axes X and Y at a given angle $\alpha$ in an infinite number of planes parallel with the Z axis. As shown in FIG. 3, a control shaft 46 is connected to conductive body 36. By rotating control shaft 46, as indicated by arrows 48 and pivoting or causing cantilever movement of control shaft 46, as indicated by arrows 50, conductive body bore longitudinal axis R can selectively be placed at any given angle $\alpha$ and in any plane that is parallel with the Z axis. Further, by preprogrammed control of the rotational and cantilever movement of control shaft 46 as described hereinbelow, bore longitudinal axis R can be caused to pivot about the X and Y axes so as to rotate about the Z axis as indicated by the dashed ring lines of travel 52 at any given angle $\alpha$. Accordingly, all the advantages discussed hereinabove with respect to the first and second current pickup assembly embodiments are attained also by this third embodiment. The preprogrammed control of control shaft 46 is achieved with a connecting rod member 54. Connecting rod 54 includes a first end 56 engaging control shaft 46 and a second end 58 pivotally connected to a drive means at pivotal point connection 64. The drive means rotationally moves connecting rod second end 58 about drive means axis 60 as shown in dashed line circle 62. Connecting rod member 54 further includes front face 66 and back face 68. At the first end 56 of connecting rod 54, a generally square aperture or window 70 is provided through connecting rod member 54 with openings in faces 66 and 68. As shown, control shaft 46 is generally square and is received in square aperture 70. Between faces 66 and 68, there are also provided connecting rod cam surfaces 72 slidingly engaging cam walls 64, shown in FIG. 3 in dashed lines.

Upon rotational movement of second end 58 of connecting rod 54 about pivot point 64 via the drive means, about the drive means axis 60 as indicated by arrows 76, through the engagement of control shaft 46 with connecting rod 54 in aperture 70, control shaft 46 is both rotated as indicated by arrows 48 and moved upward and downward in a cantilever fashion as indicated by arrows 50. Depending on the radial distance between drive means axis 60 and pivot point connection 64, control shaft 46 is pivoted as indicated by arrows 48 at an angle beta $\beta$. Accordingly, through the rotational movement of the second end 58 of connecting rod 54 about drive means axis 60, conductive body longitudinal bore R is rotated about the Z axis or the wire electrode normal straight line of travel as indicated by dashed ring lines of travel 52. Furthermore, angle $\beta$ is proportional to angle $\alpha$ and by selectively radially displacing pivot point connection 64 from drive means axis 60, angle $\alpha$ and the radial displacement of longitudinal bore axis R as indicated by dashed lines 52 can be selectively controlled.

The radial displacement between drive means axis 60 and pivot point connection 64 is selectively controlled via a variable radial displacement means located between the drive means and connecting rod 54. As shown in FIGS. 4 and 7, a plunger generally indicated as 78 is received in sleeve or cylindrical opening 80. Plunger 78 has an exterior cylindrical surface 82 and is adapted for reciprocal and rotational movement in sleeve 80. Plunger 78 includes a first end 84 and a second end 86. Plunger 78 is rotatably driven at its second end 86 thereof by a drive means or motor M through a longitudinally expandable coupling generally indicated as 88. Coupling 88 includes a square shaft 90 connected to plunger 78 at its second end 86 and a coupling member 92 connected to motor M via motor shaft 94 and rotatably driven by motor M as indicated by arrows 96. Coupling member 92 includes a longitudinal square hollow coaxially aligned with drive means axis 60 and adapted to reciprocally receive square shaft 90 therein. Thus, plunger 78 can be reciprocally moved along drive means axis 60 within sleeve 80 as indicated by arrows 100 while rotatably driven via longitudinally expandable coupling 88 and motor M.

The reciprocal movement of plunger 78 can be controlled manually or automatically and a typical manual plunger reciprocal movement control is shown in FIGS. 4 and 7. More specifically, plunger 78 includes annular rings 102 near the second end 86 and defining an annular groove 104 therebetween. An adjustment screw 106 is journalled in bores 108 and 110 of support structure 112. Adjustment screw 106 includes a control knob 114 and a threaded portion 116 threadingly engaging ear 118. Ear 118 includes a threaded bore 120 for threadingly receiving threaded portion 116 of adjustment screw 106 and, further, includes a tongue portion 122 received within annular groove 104. Tongue portion 122 slidingly engages annular rings 102 as plunger 78 is rotated about drive means axis 60, thus, by selectively rotating adjustable screw 106 as indicated by arrows 124, ear 118 is selectively reciprocated thereby also causing plunger 78 to be selectively reciprocally moved along drive means axis 60.

It is contemplated that various other means can be provided for moving plunger 78 reciprocally along drive means axis 60. For example, plunger 78 can be housed in a pneumatic cylinder and air pressure supplied selectively within the pneumatic cylinder in chambers formed on the ends 84 and 86 of plunger 78 thereby selectively reciprocating plunger 78 therein. Further, in such pneumatic embodiment, a stop can be incorporated for selectively placing plunger 78 at a desired longitudinal position within the pneumatic cylinder at the end of the particular stroke thereof and, thus, controlling the radial displacement between drive means axis 60 and pivot point connection 64.

At the first end 84 of plunger 78, there is provided a drive shaft 126 having a first end indicated as 128 and a second end indicated as 130. A drive shaft bore 132 is provided in plunger 78 extending therein from face 134 of plunger 78. Drive shaft bore 132 is substantially square shaped with a longitudinal drive shaft bore axis 136 situated at an angle with respect to drive means axis 60 and intersecting therewith at a point 138. Drive shaft 126 is also substantially square shaped and is adapted to be slidingly received in drive shaft bore 132.

At the first end 128, drive shaft 126 is pivotally connected to connecting rod 54 about pivot point 64. This pivotal connection is adapted to prevent longitudinal movement thereat of drive shaft 126 via retention rings 140 and/or by other suitable means. Cylindrical shaft 142 is journalled in cylindrical hole 144 for pivotal movement therebetween as described hereinabove. Accordingly, reciprocal longitudinal movement of plunger 78 causes reciprocal sliding of drive shaft 126 within drive shaft bore 132 and, thereby, providing selective radial displacement of pivotal point connection 64 from drive means axis 60. More specifically, movement of plunger 78 away from connecting rod 54 causes the greatest radial displacement while movement of plunger 78 towards connecting rod 54 coaxially aligns pivotal point connection 64 with drive means axis 60. Thus, the movement of plunger 78 away from connecting rod 54 increases angle o between the normal straight line of wire travel and the longitudinal bore axis R of conductive body 36 while situating point 64 coaxial with drive means axis 60, also coaxially aligns longitudinal bore axis R with the normal straight line of wire travel.

The various current pickup assemblies are received and supported within a barrel 146 and are adapted to work in conjunction with wire guide assemblies 16. More specifically, wire guide assemblies 16 include a first guide member or means 148 also referred to as the final guide and having a bore 150 therethrough, a second guide member or means 152 also referred to as the post guide and having a bore 154 therethrough and, a third guide member or means 156 also referred to as the pre guide and having a bore 158 therethrough. Bores 150, 154, and 158 receive the moving wire electrode 12 therethrough and guide the wire in the normal straight line of wire travel. The various current pickup assemblies are located between second guide or post guide member 152 and third guide or pre guide member 156 and first guide or final guide member 148 is located on the working end of guide assembly 16 or closest to workpiece 18.

Post guide 26 includes a post guide holder body 160 having a wire passageway 162 therethrough between a first opening 164 and a second opening 166. Post guide holder body 160 includes an enlarged portion generally indicated as 168 and a thinner portion generally indicated as 170. Enlarged portion 168 includes outer frusto-conically shaped walls 172 and fluid channels 176 extending generally longitudinally thereon. A guide support is provided on barrel 146 and, more specifically, at one end of barrel 146. A frusto-conical inner surface 176 is formed converging toward a hole or opening 178. Enlarged portion 168 of post guide holder body 160 is larger than guide support hole 178 and walls 172 thereof seat against frusto-conical inner surface 176 and, thus, also form fluid channels 174 therebetween. However, thinner portion 170 of post guide holder body 160 is smaller than guide support hole 178 and is, thus, received therethrough as shown. Threads 180 are provided on thinner portion 170 and a guide nut means or member 182 includes threads 184 adapted for mating engagement with the thinner portion threads 180. Accordingly, upon mating engagement of nut member threads 184 with thinner portion threads 180, nut member annular flat 186 is forced against annular flat 188, compressing 0-ring member 190 and, in a clamping fashion, locking guide holder body 160 and nut member 182 upon frusto-conical end 192 of barrel 146.

As more clearly shown in FIG. 14, guide body 16 includes a first counter bore 194 communicating with passageway 162 through first opening 164 and, also, includes a second counter bore 196 communicating with passageway 162 through second opening 166. Guide members 148 and 152 are mounted or fixed within respective counterbores 194 and 196 in a mounting material 198. Mounting material 198 substantially surrounds the guide members and conical passageways 200 are formed therein converging towards bores 150 and 154 of respective guide members 148 and 152. Preferably, guide members 148 and 152 are made of diamond, polycrystalline or single-crystal, sapphire, cubic boron nitride or other sufficiently wear-resistant materials and, mounting material 198 is made of sintered metal. Guide holder body 160 is preferably made of stainless steel.

Second guide member 152, in the alternative, can be fixed or mounted to guide holder body 160 via a plug 202 as shown in FIGS. 6 and 7. Plug 202 includes an exterior threaded surface 204 threadingly received in threaded cylindrical bore 206. Plug 202 includes a wire passageway having a counterbore or bore portion 208 wherein second guide member 152 is mounted in a mounting material 198 as described hereinabove with respect to FIG. 14. Plug 202 further includes tool holes 210 for receiving a mating tool and rotating plug 202 for threadingly engaging threads 206. Plug 202 is preferably made of stainless steel.

Guide nut member 182, in addition to locking guide holder body 160 to the end of barrel 146, aids in the automatic threading of a wire electrode 12 through guide assembly 16 and/or aids in the flushing of workpiece 18. In this regard, guide nut member 182 includes a housing 212 defining a fluid passageway 214 substantially surrounding guide body thinner portion 170. A plurality of inlet ports 216 are provided through housing 212 and communicating with fluid passageway 214 and, also, an outlet port 218 is provided and communicates with fluid passageway 214. When guide nut member 182 is threadingly received on post guide thinner portion 170, channels 174, defined in enlarged portion 168 of guide holder body 160, are aligned with fluid inlet ports 216. Further, a plurality of threading fluid ports 220 are provided in barrel 146 and communicating with an annular fluid passageway 222 formed between sleeve member 224 and the interior surface 226 of barrel 146. Annular fluid passageway 222 includes a curvilinear wall 228 for providing a smooth transition of fluid from threading fluid ports 220 to channels 174. For creating a threading or flushing jet at outlet port 218, a fluid such as deionized water under pressure, is forced as indicated by arrows A through threading fluid ports 220 around annular fluid passageway 222 into channels 174 and aligned inlet port 216 of nut member 182 into fluid passageway 214 and out through outlet port 218. Thus, outlet port 218 receives therethrough both wire electrode 12 and a threading or flushing fluid.

Figure 15:
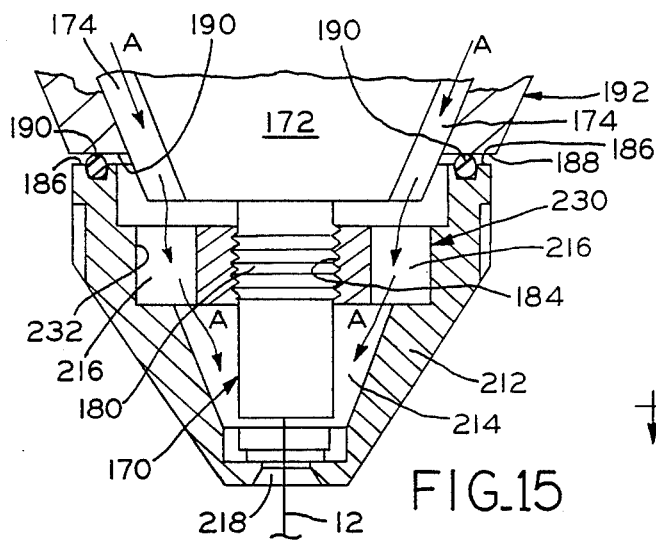
FIG. 15 is a cross-sectional view of a nut member assembled on the post guide member at the end of a barrel according to the present invention.
Figure 16:
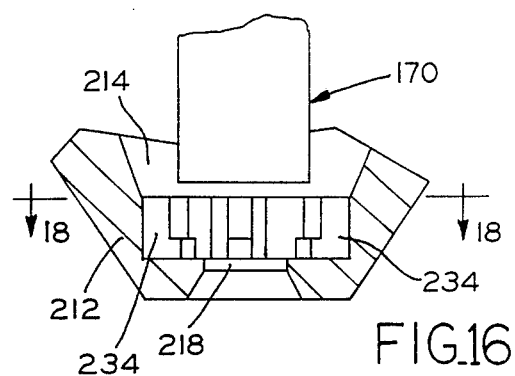
FIG. 16 is a partial cross-sectional view of the nut member shown in FIG. 15 and showing the fluid vanes thereon according to the present invention shown in FIG. 16, however, depicting an enlarged conical outlet bore; and, FIG. 17 is a partial cross-sectional view of the nut member shown in FIG. 15 and having an enlarged frusto-conical portion.

In an alternative embodiment of guide nut member 182, as shown in FIGS. 6 and 15-18, threads 184 and inlet ports 216 are formed in cross member 230. Cross member 230 is frictionally forced or press fit in bore 232 or affixed therein by any other suitable means. Thus, fluid received in channels 174, as shown in FIG. 15, travels through inlet ports 216 into fluid passageway 214 and out through outlet bore 218.

So as to provide substantially laminar fluid flow out through outlet port 218, ports 220, channels 174, inlet ports 216, fluid passageway 214, and outlet port 218, are sized so as to continually and gradually decrease in fluid flow area. Furthermore, as shown in FIGS. 15-18, fluid passageway 214 is provided with fluid vanes 234 and defining radial fluid passageways 236 wherethrough the threading fluid flows from fluid passageway 214 and out through outlet port 218. Vanes 234 may include a land 238 whereupon guide body thinner portion 170 may rest.

Figure 17:
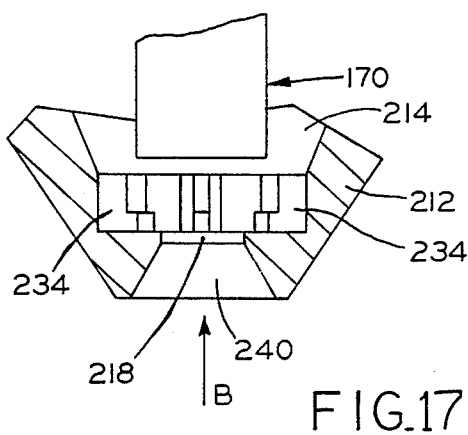
Figure 18:
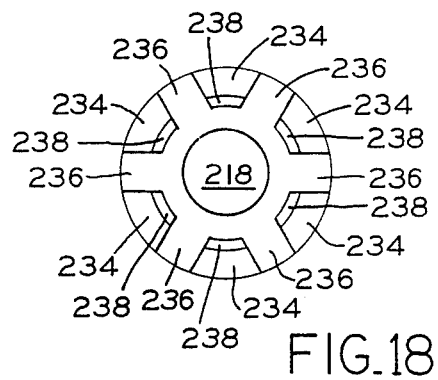
FIG. 18 is a cross-sectional view of the nut member taken line 18 of FIG. 16 according to the present invention.

As shown in FIG. 17, outlet port 218 may include an enlarged frusto-conical portion 240 whereby during automatic threading, a wire electrode 12 being received through outlet 218, as indicated by arrow B, is aided in finding its way into the bore 150 of first guide member 148.

At the frusto-conical end 192 of barrel 146 there is also provided a flushing nozzle 242 having a threaded interior bore 244 for mating engagement with threads 246 of barrel 146. Flushing nozzle 242 includes a flushing fluid inlet 248, a conical passageway 250 surrounding post guide member 26 and a flushing outlet port 252. Flushing fluid is thus received in nozzle 242 through inlet 248 into conical passageway 250 and out through flushing outlet port 252 and onto workpiece 18 thereby flushing the same Barrel 146, at the other end of frusto-conical end 192 includes a threaded interior surface portion 254. A cylindrical member 256 having exterior surface threads 258 is threadingly received in barrel 146 and engaging threads 254. Cylindrical member 256 includes an annular lip 260 adapted to rest on annular seat 262 thereby positively longitudinally placing third guide member 156. A wire passageway including threaded bore 264 is provided in cylindrical member 256 and a plug 270 is threadingly received therein. Plug 270 is identical to plug 202 except that third guide member 156, made of the same materials as members 148 and 152, is mounted therein. A frusto-conical portion 272 is formed in cylindrical member 256 and leads to conical passageway 200 formed in mounting material 198. Tool holes 274 are also provided in cylindrical member 256 for twisting and threadingly engaging cylindrical member 256 within barrel 146. Further, outlet bores 276 shown in FIG. 6 extend longitudinally through cylindrical member 256 and allow gases and/or fluid to exit from within barrel 146.

The various current pickup assemblies are situated within barrel 146 between second guide member 152 and third guide member 156 and with a control shaft 46 extending through a longitudinal bore 278 on the wall of barrel 146. As shown in FIG. 5, barrel 146 can be retained or fixed on an arm 18 by clamping barrel 146 between arm 18 and support structure 112. Support structure 112 is affixed to arm 18 via threaded screws 278 received through holes 280 in support structure 112 and threadingly engaged in threaded holes 282 in arm 18. As shown, cam walls 74 are formed in support structure 112 and connecting rod 54 engaging control shaft 46 is cammed thereagainst. In FIG. 5, the above-discussed radial displacement means and drive means are diagrammatically indicated as 284.

For aiding the smooth movement of control shaft 46 as indicated by arrows 48 and 50, the square walls of control shaft 46 received within square aperture 70 of connecting rod 54 are rounded as indicated at 286. Further, a threaded screw 288 is received through a longitudinal bore 290 and used to secure control shaft 46 to conductive body 36 and/or the various current pickup assemblies.

The various means for rotating, means for pivoting, and gimball means are described hereinafter. A first gimball means is shown in FIG. 7 wherein a ball or sphere 292 is journalled in a socket means and conductive body 36 is fixed in a bore 294 extending through ball 292. The socket means includes a first annular curvilinear surface 296 formed in sleeve member 224. Within sleeve member 224 there is also received ring member 298 wherein there is formed second annular curvilinear surface 300. A second ring member 302 threaded on its exterior surface 304 threadingly engages interior threaded surface 306 of sleeve 224. A compression spring 308 having an outer diameter smaller than the inside diameter of sleeve 224 is received between first ring member 298 and second ring member 302 and serves to push ring member 298 against ball 292, thus, journalling ball 292 between surfaces 296 and 300. It is contemplated that other socket assemblies can be used. For example, rather than using a sleeve 224 two ring members having annular curvilinear surfaces can be used for journalling ball 292 and a compression spring situated between cylindrical member 256 and one of the ring members.

Ball 292 further includes a threaded bore 310 for threadingly receiving screw 288 and attaching control shaft 46 thereon. Thus, through rotational movement as indicated by arrows 48 and cantilever movement as indicated by arrows 50, current pickup body 36 is pivoted about the X and Y axes as described hereinabove. It should also be noted that an electrical power supply is connected to barrel 146 (not shown) and because barrel 146, sleeve 224, ball 292 and conductive body 36 are made of conductive materials, current is transferred and placed on wire electrode 12 as it contacts contact wall 40.

In FIG. 10, there is shown an alternate gimball means. More specifically, a conductive body holder 312 is provided for receiving therein a conductive body 36 and retained therein with a cap 314. Cap 314 has threads 316 threadingly engaging threads 318 within conductive body holder 312. Cap 314 includes an opening 320 and the other end of conductive body holder 312 also has an opening (not shown) and, thus, wire electrode 12 travels through cap 314, conductive body 36 and conductive body holder 312.

Conductive body 312 is connected to control shaft 46 at 322 and is connected to stud 324 at 326. Control shaft 46 and stud 324 are pivotally connected or journalled at 328 and 330 respectively to ring member 332. Thus, rotational movement of control shaft 46, as indicated by arrows 48, causes pivotal movement of conductive body holder 312 about the Y axis.

Along the X axis, there are provided shaft members 334 which are connected to ring member 332. Shaft members 334 are pivotally connected at 336 in a support assembly generally indicated as 338 and which can be in barrel 146. Accordingly, cantilever movement of control shaft 46 as indicated by arrows 50 causes pivotal movement of conductive body holder 312 about the X axis as indicated by arrows 340. Shaft members 334, control shaft 46, stud 324 and conductive body holder 312 are made of conductive materials and electrical current can, thus, be transferred to conductive body 36 by applying current to shaft members 334 through support assembly 338. In the alternative, a braided wire or the like can be attached to conductive body holder 312 and connected to the power source. It should also be noted that conductive body 36 can itself be pivotally connected to ring member 332 without utilizing conductive body holder 312.

In yet a different gimball means, as shown in FIGS. 6, 8, and 9, a first annular member 342 is supported in a support assembly such as within barrel 146. First annular member 342 includes a notch 344 and an inner bore 346. A first spring means such as leaf springs 347 are connected at their first end 348 at 350 to first annular member 342. Connections 350 can be a longitudinal slot cut into first annular member 342 and receiving first end 348 of leaf spring 347. Leaf springs 347 extend longitudinally from first annular member 342 and are adapted for cantilever movement at their second end 352 with respect to the first annular member in a first plane or generally about a line formed between connections 350 of leaf springs 347 to first annular member 342. A second annular member 354 is generally oval-shaped and has an inner cavity 356. Second annular member 354 is connected to leaf springs 347 at their second ends 352 thereof at the longitudinal ends 358 of second annular member 354. Second annular member 354 also includes a notch 360 located longitudinally above notch 344.

Second spring means or two other leaf springs 362 are connected to the second annular member 354 at 364. Connections 364 of leaf springs 362 are identical to connections 350 and leaf springs 362 extend longitudinally therefrom towards first annular member 342 and, because second annular member 354 is oval-shaped and connections 364 are at the shortest radial distance from the Z axis, leaf springs 362 extend to within inner bore 346 of first annular member 342. Accordingly, the second ends 366 are adapted for cantilever movement about a line defined between connections 364 in a second plane perpendicular to the first plane.

A third annular member 368 is connected to leaf springs 362 at connections 370 in a similar fashion as connections 350. Third annular member 368 includes a conductive body receiving bore 372 adapted to receive therein conductive body or pickup 36. An L-shaped arm 374 is connected to third annular member 368 and includes a threaded hole 376 through L-shaped arm 374 and third annular member 368. A small screw 378 is received in and through threaded hole 376 and when conductive body 36 is situated within third annular member 368 as shown in FIG. 9, serves to lock or clamp conductive body 36 within third annular member 368. At the other end of L-shaped arm 374, there is a threaded hole 380 and a screwdriver-type groove 382. An elongate projection 384 is provided on the end of control shaft 46 and is adapted to be received in groove 382. Screw 288 is received through longitudinal bore 290 of control shaft 46 and threadingly engages threaded hole 380 for connecting control shaft 46 to L-shaped arm 374. Elongate projection 384 and groove 382 prevent rotational slippage of control shaft 46 when control shaft is pivoted as indicated by arrows 48.

Accordingly, rotational movement of control shaft 46 causes conductive body 36 to pivot about the Y axis while cantilever movement of control shaft 46 causes conductive body 36 to pivot about the X axis. A sleeve member 386 is received over second annular member 354 and enclosing the same as shown in FIG. 6 without preventing the gimballing movement of conductive body 36. Sleeve member 386 includes a notch 388 aligned with notch 344 of first annular member 342 and, thus, providing an opening wherethrough control shaft 46 is connected to L-shaped arm 374.

This gimballing means utilizing spring means provides pivotal movement of conductive body 36 about two perpendicular and intersecting axes as with the other gimball means. Further, current is placed on first annular member 342 by contacting the support structure or barrel 146 and is advantageously delivered to conductive body 36 with constant positive electrical connections and without having to pass through any pivotal or journalled connections.

In FIGS. 11 and 12, there are shown the preferred second embodiments of the current pickup assemblies wherein a pivot means is provided for supporting conductive body 36 and selectively pivoting the same about the X axis as indicated by arrows 390. More specifically, a ring member 392 having an annular groove 394 is connected to shaft members 334. Shaft members 334 are pivotally connected at 336 to a support structure or assembly diagrammatically shown as 338 and which can be, for example, barrel 146. Conductive body holder 312 and/or conductive body 36 are connected to an annular washer or journal member 396 journalled in annular groove 394 and thereby providing rotational movement of conductive body holder 312 and/or conductive body 36 about the longitudinal bore axis R as indicated by arrows 44.

In FIG. 11, a worm gear 398 is formed or connected to conductive body 36 or holder 312 and a mating worm 400 is connected to or formed on control shaft 46. Control shaft 46 is pivotally connected to ring member 392 in two holes 402 and, thus, placing worm 400 in mating engagement with worm gear 398. By rotating control shaft 46, as indicated by arrows 48, conductive body 36 or holder 312 may be pivoted about bore longitudinal axis R as indicated by arrows 44. Further, cantilever movement of control shaft 46 as indicated by arrows 50, causes ring member 392, conductive body 362, or holder 312 and the body longitudinal axis R to pivot about the X axis and, thus, placing the bore longitudinal axis R at an angle α with respect to the normal straight line of wire travel.

In FIG. 12, a bevel gear 404 is connected to or formed on annular washer or journal member 396 and a mating pinion 406 is formed or connected to control shaft 46. Control shaft 46 is pivotally connected or journalled in hole 408 and places pinion 406 in mating engagement with bevel gear 404. As described with respect to FIG. 11, rotational and cantilever movement of control shaft 46 pivots conductive body 36 or holder 312 about the X axis and rotates the same about longitudinal bore axis R.

While the invention has been described as having specific embodiments, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A guide assembly for guiding an electrical discharge machine apparatus moving wire electrode through a workpiece, said assembly comprising:
   first, second and third guide members each having a bore for receiving the moving wire electrode therethrough and guiding the moving wire electrode;
   a current pick-up between said second and third guide members in contact with the moving wire electrode and placing electric current thereon; and, wherein said first guide member is to be located closest to the workpiece compared to said second and third guide member; and,
   a post guide body having a wire passageway therethrough between first and second openings, said first guide member mounted to said body with said first guide member bore communicating with said passageway through said first passageway opening and said second guide member mounted to said body with said second guide member bore communicating with said passageway through said second passageway opening.

2. The guide assembly of claim 1 wherein said first, second and third guide members are made of diamond.

3. The guide assembly of claim 1 wherein said second guide member is mounted on a threaded plug and said guide body wire passageway includes a threaded bore at said second opening thereof, said plug threadingly received in said threaded cylindrical bore, said plug including a wire passageway communicating with said second guide member bore.

4. The guide assembly of claim 3 wherein said plug wire passageway includes a counterbore portion and wherein said second guide member is mounted in said plug counterbore in a mounting material received therein.

5. The guide assembly of claim 4 wherein said first guide member is made of diamond and said mounting material is sintered metal.

6. The guide assembly of claim 1 wherein said post guide body includes first and second counterbores at said respective first and second passageway openings, said first and second guide members being mounted in said respective first and second counterbores in a mounting material in said first and second counterbores.

7. The guide assembly of claim 6 wherein said first and second guide members are made of diamond and said mounting material is sintered metal.

8. The guide assembly of claim 6 wherein said mounting material in each of said first and second counterbores substantially surrounds said respective first and second guide members and conical passageways are formed in said mounting material converging toward said respective first and second guide member bores.

9. The guide assembly of claim 1 further comprising a post guide support with a hole therethrough, wherein said post guide body is enlarged towards said second opening thereof and is thinner towards said first opening thereof, said enlarged portion being larger than said post guide support hole and said thinner portion being threaded and smaller than said post guide support hole and being received therethrough, and further including a post guide nut member having threads for mating engagement with said thinner portion threads and being larger than said post guide support hole, whereby upon mating engagement of said nut member with said thinner portion threads, said post guide support is clamped between said guide body enlarged, portion and said nut member.

10. The guide assembly of claim 9 wherein said nut member includes a housing defining a fluid passageway substantially surrounding said thinner portion near said first guide member, said nut member housing having an inlet port and an outlet port communicating with said fluid passageway, said outlet port receiving the moving wire electrode therethrough.

11. The guide assembly of claim 10 wherein said post guide body enlarged portion includes a channel extending through said support hole and providing fluid communication therethrough, said channel fluidly communicating with said nut member housing inlet port when said nut member is threadingly received on said post, guide, thinner portion.

12. The guide assembly of claim 11 further comprising fluid vanes in said housing for directing fluid received in said housing through said inlet port out through said outlet port.

13. The guide assembly of claim 10 further comprising fluid vanes in said housing for directing fluid received in said housing through said inlet port out through said outlet port.

14. The guide assembly of claim 10 wherein said post guide body includes first and second counterbores at said respective first and second passageway openings, said first and second guide members being mounted in said respective first and second counterbores in a mounting material in said first and second counterbores and, wherein said second and third guide members are made of diamond and said mounting material is sintered metal.

15. The guide assembly of claim 9 wherein said post guide nut member includes a frusto conical bore communicating with and converging, towards said first guide member bore.

16. The guide assembly of claim 9 wherein said post guide body includes first and second counterbores at said respective first and second passageway openings, said first and second guide members being mounted in said respective first and second counterbores in a mounting material in said first and second counterbores and, wherein said second and third guide members are made of diamond and said mounting material is sintered metal.

17. A guide assembly for guiding an electrical discharge machine apparatus moving wire electrode through a workpiece, said assembly comprising:
first, second and third guide members each having a bore for receiving the moving wire electrode therethrough and guiding the moving wire electrode;
a current pick-up between said second and third guide members in contact with the moving wire electrode and placing electric current thereon; and,
wherein said first guide member is to be located closest to the workpiece compared to said second and third guide members; and,
a barrel having a threaded interior surface portion and wherein said third guide member is mounted on a cylindrical member having exterior surface threads for mating engagement with said barrel interior surface threads, said cylindrical member including a wire passageway therethrough communicating with said first guide member bore.

18. The guide assembly of claim 17 wherein said third guide member is mounted on a threaded plug and said cylindrical member wire passageway includes a threaded bore, said plug threadingly received in said threaded cylindrical member bore, said plug including a wire passageway communicating with said third guide member bore.

19. The guide assembly of claim 18 wherein said plug wire passageway includes a counterbore portion and wherein said first guide member is mounted in said plug counterbore in a mounting material received therein.

20. The guide assembly of claim 19 wherein said first guide member is made of diamond and said mounting material is sintered, metal.

21. The guide assembly of claim 18 wherein said third guide member is made of diamond.

22. The guide assembly of claim 17 wherein said cylindrical member includes a fluid passageway therethrough.

23. The guide assembly of claim 17 wherein said third guide member is made of diamond.

24. A guide assembly for guiding an electrical discharge machine apparatus moving wire electrode through a workpiece, said assembly comprising:
a guide body having a wire passageway therethrough between first and second openings;
a first guide member having a bore therethrough mounted on said guide body, said first guide member bore communicating with said passageway through said first opening;
a guide support having a hole therethrough;
wherein said guide body is enlarged towards said second opening thereof and is thinner towards said first opening thereof, said enlarged portion being larger than said guide support hole and said thinner portion being threaded and being smaller than said guide support hole and received therethrough; and,
a guide nut member having threads for mating engagement with said thinner portion threads and being larger than said guide support hole, whereby upon mating engagement of said nut member with said thinner portion threads, said guide support is locked between said guide body enlarged portion and said nut member.

25. The guide assembly of claim 24 further comprising a second guide member having a bore therethrough mounted on said guide body, said second guide body bore communicating with said passageway, through said second opening.

26. The guide assembly of claim 25 wherein said first and second guide members are made of diamond.

27. The guide assembly of claim 24 wherein said nut member includes a housing defining a fluid passageway substantially surrounding said thinner portion near said first guide member, said nut member housing having an inlet port and an outlet port communicating with said fluid passageway, said outlet port receiving the moving wire electrode therethrough.

28. The guide assembly of claim 27 wherein said guide body enlarged portion includes a channel extending through said support hole and providing fluid communication therethrough, said channel fluidly communicating with said nut member housing inlet port when said nut member is threadingly received on said post guide thinner portion.

29. The guide assembly of claim 28 further comprising fluid vanes in said housing for directing fluid received in said housing through said inlet port out through said outlet port.

30. The guide assembly of claim 25 wherein said guide body includes first and second counterbores at said respective first and second passageway openings, said first and second guide members being mounted in said respective first and second counterbores in a mounting material received in said first and second counterbores.

31. The guide assembly of claim 30 wherein said first and second guide members are made of diamond and said mounting material is sintered metal.

32. The guide assembly of claim 30 wherein said mounting material in each said first and second counterbores substantially surrounds said respective first and second guide members and conical passageways are formed in said mounting material converging towards said respective first and second guide member bores.

33. The guide assembly of claim 32 wherein said first and second guide members are made of diamond and said mounting material is sintered metal.

34. The guide assembly of claim 24 wherein said post guide nut member includes a frusto conical bore communicating with and converging towards said first guide member bore.

35. The guide assembly of claim 25 wherein said second guide member is mounted on a threaded plug and said guide body wire passageway includes a threaded bore at said second opening thereof, said plug threadingly received in said threaded cylindrical bore, said plug including a wire passageway communicating with said second guide member bore.

36. The guide assembly of claim 35 wherein said plug wire passageway includes a counterbore portion and wherein said second guide member is mounted in said plug counterbore in a mounting, material received therein.

37. The guide assembly of claim 36 wherein said first guide member is made of diamond and said mounting material is sintered metal.

* * * * *

UNITED STATES PATENT AND TRADEMARK OFFICE
CERTIFICATE OF CORRECTION

PATENT NO. : 4,945,200

DATED : July 31, 1990

INVENTOR(S) : Thomas J. Truty, et al

It is certified that error appears in the above-identified patent and that said Letters Patent is hereby corrected as shown below:

Col. 4, line 24, after "taken" insert --along--.

Col. 8, line 15, after "angle" delete "o" and insert --$\alpha$--

Claim 11, col. 15, line 5, delete "," before and after "guide".

Claim 20, col. 16, line 3, delete "," after "sintered".

Signed and Sealed this

Twenty-eighth Day of January, 1992

*Attest:*

HARRY F. MANBECK, JR.

*Attesting Officer*      *Commissioner of Patents and Trademarks*